(12) United States Patent
Ueno et al.

(10) Patent No.: US 9,714,781 B2
(45) Date of Patent: Jul. 25, 2017

(54) TRANSPORT REFRIGERATION APPARATUS

(75) Inventors: Akitoshi Ueno, Sakai (JP); Kiichirou Satou, Sakai (JP); Masataka Nakano, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 586 days.

(21) Appl. No.: 14/234,353

(22) PCT Filed: Jul. 25, 2012

(86) PCT No.: PCT/JP2012/004748
§ 371 (c)(1),
(2), (4) Date: Jan. 22, 2014

(87) PCT Pub. No.: WO2013/018326
PCT Pub. Date: Feb. 7, 2013

(65) Prior Publication Data
US 2014/0150482 A1 Jun. 5, 2014

(30) Foreign Application Priority Data
Jul. 29, 2011 (JP) .................. 2011-167464

(51) Int. Cl.
*H02H 3/38* (2006.01)
*H02H 7/08* (2006.01)
(Continued)

(52) U.S. Cl.
CPC ............ *F25B 49/02* (2013.01); *F25D 29/003* (2013.01); *H02H 7/0852* (2013.01);
(Continued)

(58) Field of Classification Search
CPC ............ F25B 2600/11; F25B 2600/111; F25B 2600/112; H02P 29/024; H02P 29/0241; B60H 1/32; H02H 3/382; H02H 7/08
See application file for complete search history.

(56) References Cited

U.S. PATENT DOCUMENTS

| 4,488,100 A | 12/1984 | Fujii et al. |
| 5,148,115 A * | 9/1992 | Koakutsu ............... H03F 1/305 330/2 |

(Continued)

FOREIGN PATENT DOCUMENTS

| JP | 55-82063 A | 6/1980 |
| JP | 60-159545 A | 8/1985 |

(Continued)

OTHER PUBLICATIONS

International Search Report issued in PCT/JP2012/004748, dated Oct. 30, 2012.
(Continued)

*Primary Examiner* — Ryan J Walters
*Assistant Examiner* — Erik Mendoza-Wilkenfe
(74) *Attorney, Agent, or Firm* — Birch, Stewart, Kolasch & Birch, LLP

(57) ABSTRACT

According to the present disclosure, in a container refrigeration apparatus configured to cool the inside of a container, the accuracy of determination of occurrence of a lock abnormality and a connection abnormality of a motor is increased, and erroneous detection of the motor abnormalities is reduced or prevented. The container refrigeration apparatus of the present disclosure includes an abnormality determinator configured to compare a value for current flowing through an in-compartment motor with a preset current threshold to determine occurrence of the motor abnormalities of the in-compartment motor, and a threshold changer configured to change the current threshold of the abnormality determinator in accordance with a supply voltage for each supply frequency of a power supply configured to supply power to the in-compartment motor.

10 Claims, 7 Drawing Sheets

(51) Int. Cl.
  *H02P 29/024* (2016.01)
  *F25B 49/02* (2006.01)
  *F25D 29/00* (2006.01)
  *H02H 7/085* (2006.01)
  *H02P 29/032* (2016.01)

(52) U.S. Cl.
  CPC .......... *H02P 29/027* (2013.01); *H02P 29/032* (2016.02); *F25B 2600/11* (2013.01); *F25B 2700/151* (2013.01)

(56) References Cited

U.S. PATENT DOCUMENTS

| | | | | |
|---|---|---|---|---|
| 6,485,057 | B1* | 11/2002 | Midorikawa | B60R 21/01 280/801.1 |
| 2007/0252547 | A1 | 11/2007 | Kifuku et al. | |
| 2009/0115620 | A1* | 5/2009 | Hunter | H02H 3/006 340/664 |
| 2009/0133419 | A1* | 5/2009 | Matsuno | B60P 3/20 62/239 |
| 2009/0133420 | A1 | 5/2009 | Kitamura et al. | |

FOREIGN PATENT DOCUMENTS

| | | |
|---|---|---|
| JP | 63-176980 A | 7/1988 |
| JP | 63-212785 A | 9/1988 |
| JP | 8-19172 A | 1/1996 |
| JP | 9-149547 A | 6/1997 |
| JP | 2001-74350 A | 3/2001 |
| JP | 2007-93122 A | 4/2007 |
| JP | 2009-159750 A | 7/2009 |
| JP | 2001-333589 A | 11/2011 |

OTHER PUBLICATIONS

Written Opinion of the International Searching Authority issued in PCT/JP2012/004748, dated Oct. 30, 2012.

\* cited by examiner

TRANSPORT REFRIGERATION APPARATUS

TECHNICAL FIELD

The present disclosure relates to a transport refrigeration apparatus. In particular, the present disclosure relates to a technique for detecting abnormalities of a motor used for a transport refrigeration apparatus.

BACKGROUND ART

Conventionally, a container refrigeration apparatus configured to cool the inside of a container used for, e.g., marine transportation has been known as a transport refrigeration apparatus (see, e.g., Patent Document 1).

The container refrigeration apparatus may include a detector configured to detect abnormalities of a motor for driving a compressor and an air blower.

Of the motor abnormalities, occurrence of a lock abnormality and a connection abnormality can be typically determined based on a value for current flowing through the motor. If the motor current value is extremely greater than a rated current value, it is determined that the lock abnormality occurs. On the other hand, if the motor current value is extremely smaller than the rated current value, it is determined that the connection abnormality occurs. Specifically, a current threshold for lock abnormality and a current threshold for connection abnormality are set, and the magnitude of each current threshold and the magnitude of the motor current value are compared with each other to determine occurrence of the abnormality.

CITATION LIST

Patent Document

PATENT DOCUMENT 1: Japanese Unexamined Patent Publication No. 2007-093122

SUMMARY OF THE INVENTION

Technical Problem

However, since the container travels around the world, the container refrigeration apparatus is intended to be connected to power supplies which are different from each other in supply voltage and supply frequency among countries. The value for current flowing through the motor varies due to the difference in supply voltage and supply frequency. Thus, if the current thresholds are fixed, there are disadvantages that it is difficult to determine occurrence of the lock abnormality and the connection abnormality and that erroneous determination occurs even if it is determined that the lock abnormality and/or the connection abnormality occur.

The present disclosure has been made in view of the foregoing, and aims to increase, in a transport refrigeration apparatus, the accuracy of determination on occurrence of a lock abnormality and a connection abnormality of a motor to reduce or prevent erroneous detection of the motor abnormalities.

Solution to the Problem

A first aspect of the invention is intended for a transport refrigeration apparatus including a refrigerant circuit (20) in which a refrigeration cycle is performed. The transport refrigeration apparatus includes a fan (26) configured to supply air to an air heat exchanger (25) connected to the refrigerant circuit (20); a fan motor (1) configured to drive the fan (26); an abnormality determinator (44) configured to compare a current value for current flowing through the fan motor (1) with a preset current threshold to determine occurrence of a motor abnormality of the fan motor (1); and a threshold changer (45) configured to change the current threshold of the abnormality determinator (44) in accordance with a supply frequency and a supply voltage of a power supply (42) configured to supply power to the fan motor (1).

In the first aspect of the invention, the current threshold of the abnormality determinator (44) is changed based on the supply frequency and the supply voltage of the power supply (42). An effective value for current flowing through the fan motor (1) varies depending on the supply frequency and the supply voltage of the power supply (42). If the current threshold is fixed regardless of a change in supply frequency and supply voltage of the power supply (42), the current value of the fan motor (1) may exceed or fall below the current threshold due to the change in supply frequency and supply voltage. In such a case, even though the fan motor (1) is normally operated, the abnormality determinator (44) may erroneously determine that the motor abnormality occurs. For such a reason, the accuracy of determination of occurrence of the motor abnormality of the fan motor (1) is increased in such a manner that the current threshold is changed depending on the change in supply frequency and supply voltage of the power supply (42).

A second aspect of the invention is intended for the transport refrigeration apparatus of the first aspect of the invention, in which if the current value of the fan motor (1) is greater than a preset current threshold for lock abnormality, the abnormality determinator (44) determines that the motor abnormality is a lock abnormality.

In the second aspect of the invention, the current threshold for lock abnormality is set for the abnormality determinator (44), and the abnormality determinator (44) determines that the motor abnormality is the lock abnormality when the current value of the fan motor (1) is greater than the current threshold for lock abnormality.

A third aspect of the invention is intended for the transport refrigeration apparatus of the second aspect of the invention, in which for each value for frequency of the power supply (42), the threshold changer (45) increases the current threshold for lock abnormality when the supply voltage of the power supply (42) increases, and decreases the current threshold for lock abnormality when the supply voltage of the power supply (42) decreases.

In the third aspect of the invention, even if a motor load is fixed, the current value of the fan motor (1) is, for each value for supply frequency of the power supply (42), increased when the supply voltage of the power supply (42) increases. Thus, for each value for supply frequency of the power supply (42), a higher current threshold is set when the supply voltage increases. Moreover, for each value for supply frequency of the power supply (42), a lower current threshold is set when the supply voltage decreases.

A fourth aspect of the invention is intended for the transport refrigeration apparatus of the first aspect of the invention, in which if the current value of the fan motor (1) is less than a preset current threshold for connection abnormality, the abnormality determinator (44) determines that the motor abnormality is a connection abnormality.

In the fourth aspect of the invention, the current threshold for connection abnormality is set for the abnormality determinator (44), and the abnormality determinator (44) determines that the motor abnormality is the connection abnormality when the current value of the fan motor (1) is less than the current threshold for connection abnormality.

A fifth aspect of the invention is intended for the transport refrigeration apparatus of the fourth aspect of the invention, in which for each value for frequency of the power supply (42), the threshold changer (45) increases the current threshold for connection abnormality when the supply voltage of the power supply (42) increases, and decreases the current threshold for connection abnormality when the supply voltage of the power supply (42) decreases.

In the fifth aspect of the invention, even if the motor load is fixed, the current value of the fan motor (1) is, for each value for supply frequency of the power supply (42), increased when the supply voltage of the power supply (42) increases. Thus, for each value for supply frequency of the power supply (42), a higher current threshold is set when the supply voltage of the power supply (42) increases. Moreover, for each value for supply frequency of the power supply (42), a lower current threshold is set when the supply voltage of the power supply (42) decreases.

A sixth aspect of the invention is intended for the transport refrigeration apparatus of any one of the first to fifth aspects of the invention, which includes a compressor motor (3) configured to drive a compressor (21) connected to the refrigerant circuit (20); an electric circuit (41) connected to the fan motor (1) and the compressor motor (3); a first detector (5) configured to detect a current value for current flowing from the power supply (42) to the electric circuit (41); and a second detector (6) configured to detect a current value for current flowing through the compressor motor (3). The current value for current flowing through the fan motor (1) is determined based on a value obtained by subtracting the current value of the second detector (6) from the current value of the first detector (5).

In the sixth aspect of the invention, current flowing through the fan motor (1) is, without directly detecting the current flowing through the fan motor (1), determined based on the value obtained by subtracting the detection value (i.e., a current value of the compressor motor (3)) of the second detector (6) from the detection value (i.e., a current value of the electric circuit (41)) of the first detector (5).

In comparison with the current value of the fan motor (1) and the current value of the compressor motor (3), the current value of the fan motor (1) is extremely smaller. For such a reason, an expensive detector (e.g., a current sensor) capable of detecting minute current should be used for detection of the current value of the fan motor (1). On the other hand, the expensive detector is not necessarily used for the compressor motor (3), and a relatively-low cost detector may be provided in the compressor motor (3). Thus, the inexpensive detector is attached to the compressor motor (3) to estimate the current value of the fan motor (1) based on a detection value of such a typical detector.

Advantages of the Invention

According to the present disclosure, since the current threshold of the abnormality determinator (44) is changed based on the supply voltage for each value for supply frequency of the power supply (42), the accuracy of determination of occurrence of the motor abnormality of the fan motor (1) can be increased. This reduces or prevents erroneous detection of the motor abnormality.

According to the second aspect of the invention, since the current threshold for lock abnormality is set for the abnormality determinator (44), it can be ensured that the lock abnormality of the fan motor (1) is detected.

According to the third aspect of the invention, for each value for supply frequency, a higher current threshold is set when the supply voltage increases, and a lower current threshold is set when the supply voltage decreases. Thus, the accuracy of determination of occurrence of the lock abnormality of the fan motor (1) can be increased.

According to the fourth aspect of the invention, since the current threshold for connection abnormality is set for the abnormality determinator (44), it can be ensured that the connection abnormality of the fan motor (1) is detected.

According to the fifth aspect of the invention, for each value for supply frequency, a higher current threshold is set when the supply voltage increases, and a lower current threshold is set when the supply voltage decreases. Thus, the accuracy of determination of occurrence of the connection abnormality of the fan motor (1) can be increased.

According to the sixth aspect of the invention, since the current value of the fan motor (1) is extremely smaller than the current value of the compressor motor (3), a high accuracy detector is required to directly detect the current value of the fan motor (1). However, since the detector is provided in the compressor motor (3), the current value can be detected using the typical detector. Moreover, since the current value of the fan motor (1) is estimated from the current value of the compressor motor (3), a cost for detection of the current value of the fan motor (1) can be reduced.

DESCRIPTION OF EMBODIMENTS

Embodiments of the present disclosure will be described below with reference to drawings. Note that the embodiments described below will be set forth merely for the purpose of preferred examples in nature, and are not intended to limit the scope, applications, and use of the invention.

First Embodiment

Figure 1:
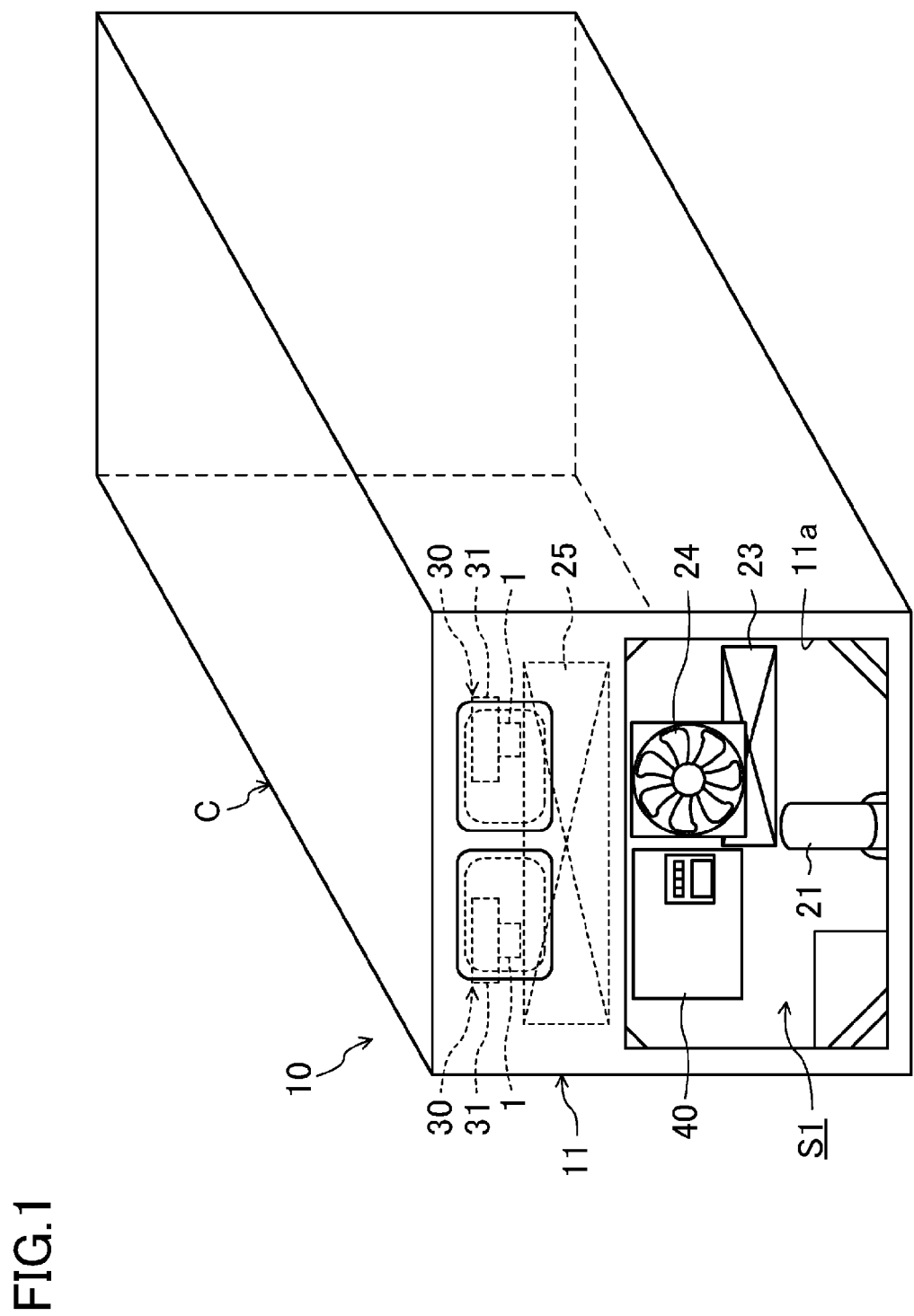
FIG. 1 is an outline of a container refrigeration apparatus of a first embodiment of the present disclosure.
Figure 2:
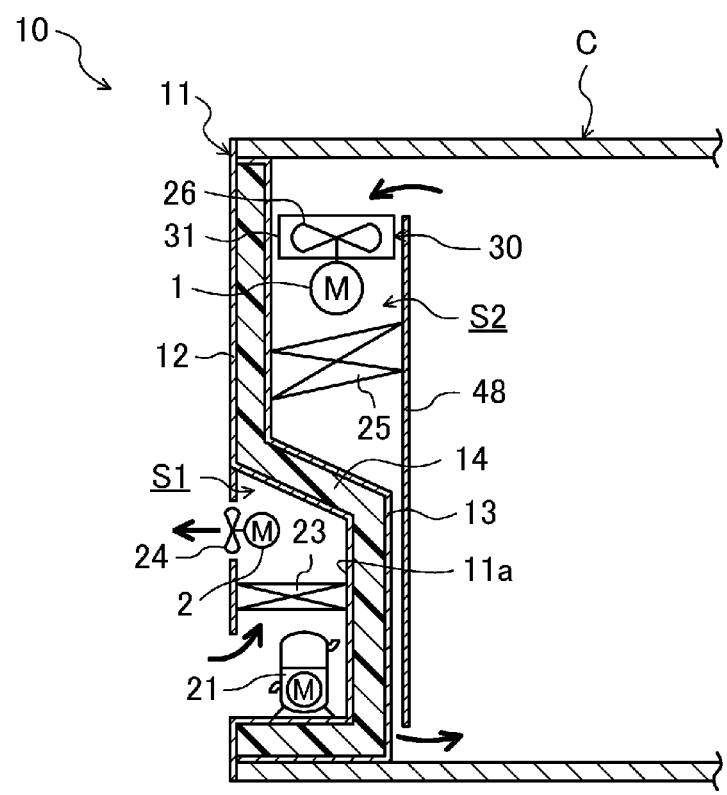
FIG. 2 is a side longitudinal sectional view illustrating a configuration of the container refrigeration apparatus.
Figure 3:
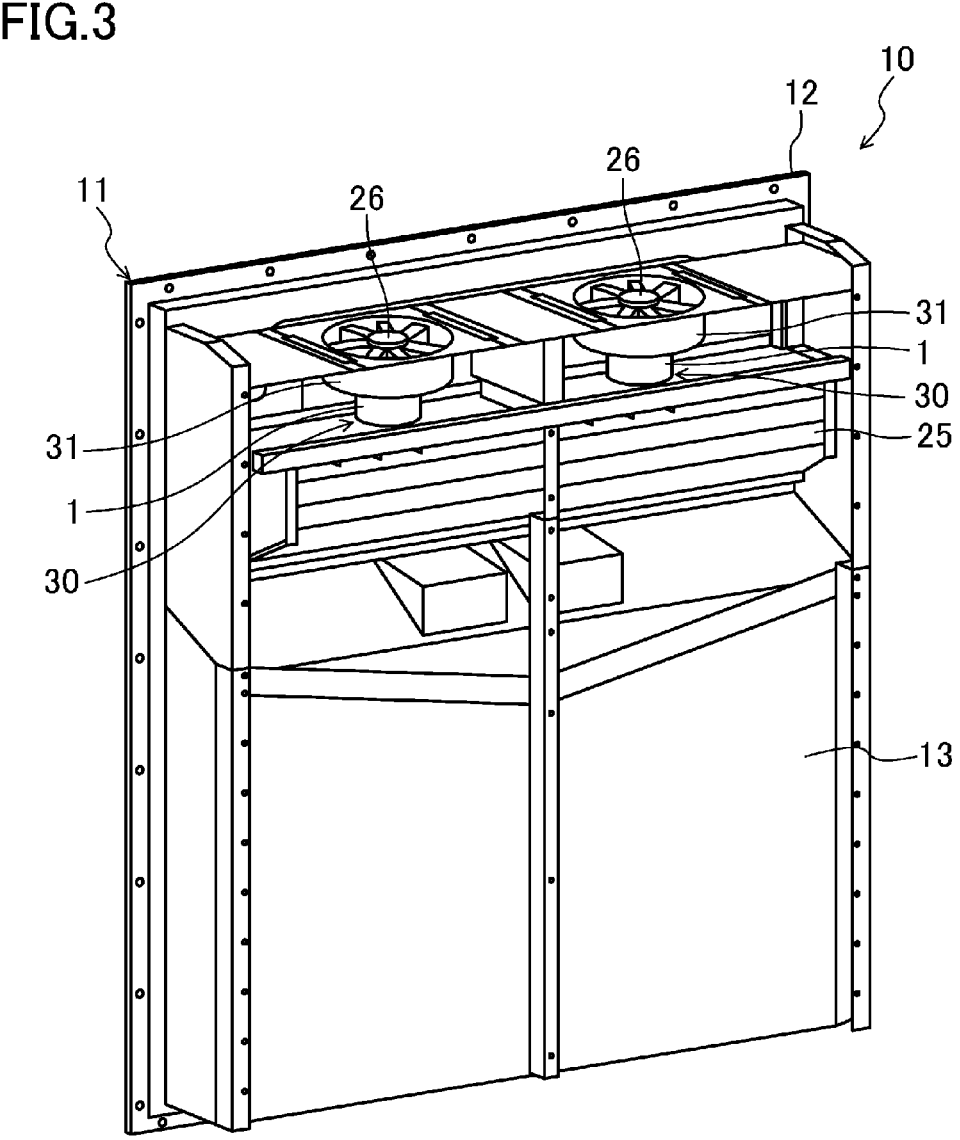
FIG. 3 is a perspective view of a casing from the inside of a compartment.

In a first embodiment, a transport refrigeration apparatus is employed as a container refrigeration apparatus (10) as illustrated in FIGS. 1 and 2. The container refrigeration apparatus (10) is configured to refrigerate or freeze the inside of a container (C) used for, e.g., marine transportation. The container refrigeration apparatus (10) is disposed so as to close an opening end of the box-shaped container (C) opening at one lateral end thereof. The container refrigeration apparatus (10) includes a casing (11), a refrigerant circuit (20), and a controller (40).

<Casing>

Referring to FIGS. 1 and 2, the casing (11) is, a circumferential edge thereof, attached to the container (C) so as to close the opening end of the container (C). A lower part of the casing (11) is formed so as to protrude toward the inside of a compartment of the container (C), and therefore forms a recess (11a) outside the compartment. That is, an outside-compartment housing space (S1) is formed outside the compartment relative to the lower part of the casing (11), and an in-compartment housing space (S2) is formed inside the compartment relative to an upper part of the casing (11).

A partition plate (48) is disposed inside the compartment relative to the casing (11). The partition plate (48) divides between the compartment of the container (C) and the in-compartment housing space (S2). Note that the partition plate (48) is disposed such that a clearance is formed between an inner surface of the container (C) and an upper end of the partition plate (48) and that another clearance is formed between the inner surface of the container (C) and a lower end of the partition plate (48).

A compressor (21), a condenser (23) serving as an air heat exchanger, an outside-compartment fan (24), and an outside-compartment motor (2) are provided in the outside-compartment housing space (S1). Moreover, an evaporator (25) serving as an air heat exchanger and air blower units (30) are provided in the in-compartment housing space (S2) formed inside the compartment relative to the upper part of the casing (11). Each air blower unit (30) includes a fan housing (31) and an in-compartment fan (26).

The casing (11) includes an outside-compartment casing part (12) positioned outside the compartment, and an in-compartment casing part (13) positioned inside the compartment. The outside-compartment casing part (12) and the in-compartment casing part (13) are made of an aluminum metal alloy. Moreover, an heat insulator (14) is provided in a space between the outside-compartment casing part (12) and the in-compartment casing part (13).

<Refrigerant Circuit>

Figure 4:
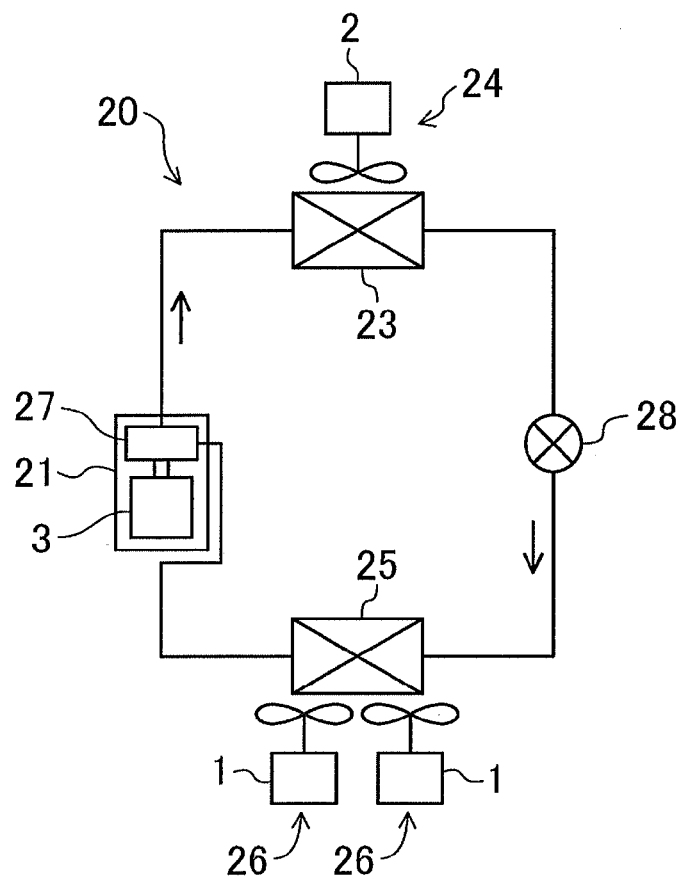
FIG. 4 is a refrigerant circuit diagram of the container refrigeration apparatus.

Referring to FIG. 4, the compressor (21), the condenser (23), an electronic expansion valve (28), and the evaporator (25) are connected together in this order through a pipe in the refrigerant circuit (20).

The compressor (21) includes a compression mechanism (27) and a compressor motor (3) which are connected together through a drive shaft. The compression mechanism (27) is driven by the compressor motor (3). The compression mechanism (27) takes low-pressure gas refrigerant evaporated in the evaporator (25), and compresses the low-pressure gas refrigerant to a predetermined pressure to form high-pressure gas refrigerant. Then, the compression mechanism (27) discharges the high-pressure gas refrigerant to the condenser (23).

The condenser (23) and the evaporator (25) are cross-fin type fin-and-tube heat exchangers. The condenser (23) is configured to exchange heat between outside-compartment air taken by the outside-compartment fan (24) provided near the condenser (23) and high-pressure gas refrigerant of the refrigerant circuit (20). The outside-compartment motor (2) configured to rotate a propeller fan of the outside-compartment fan (24) is provided in the outside-compartment fan (24).

On the other hand, the evaporator (25) is configured to exchange heat between in-compartment air taken by each in-compartment fan (26) provided near the evaporator (25) and low-pressure refrigerant of the refrigerant circuit (20). An in-compartment motor (1) configured to rotate a propeller fan of the in-compartment fan (26) is provided in each in-compartment fan (26).

The rotational speed of each in-compartment motor (1) is controllable by tap switching depending on whether or not the container refrigeration apparatus (10) is in a refrigeration operation or a freezing operation. In comparison of an in-compartment temperature between the refrigeration operation and the freezing operation, the in-compartment temperature is lower in the freezing operation. In the refrigeration operation, in-compartment air is intentionally circulated to cool the inside of the compartment, and a cooling capacity is adjusted in such a manner that the volume of discharged air of the container refrigeration apparatus (10) is changed. Thus, the container refrigeration apparatus (10) is not thermo-off typically in the refrigeration operation. On the other hand, in the freezing operation, since the inside of the compartment is cooled with a natural convection current in most cases, each in-compartment fan (26) is operated with a low air volume with the container refrigeration apparatus (10) being thermo-off.

The heat exchange in the evaporator (25) allows low-pressure refrigerant to absorb heat of in-compartment air, resulting in evaporation of the low-pressure refrigerant. Meanwhile, the in-compartment air is cooled by providing the heat to the low-pressure refrigerant. As described above, the inside of the container (C) is cooled in such a manner that in-compartment air is cooled.

<Electric Circuit>

Figure 5:
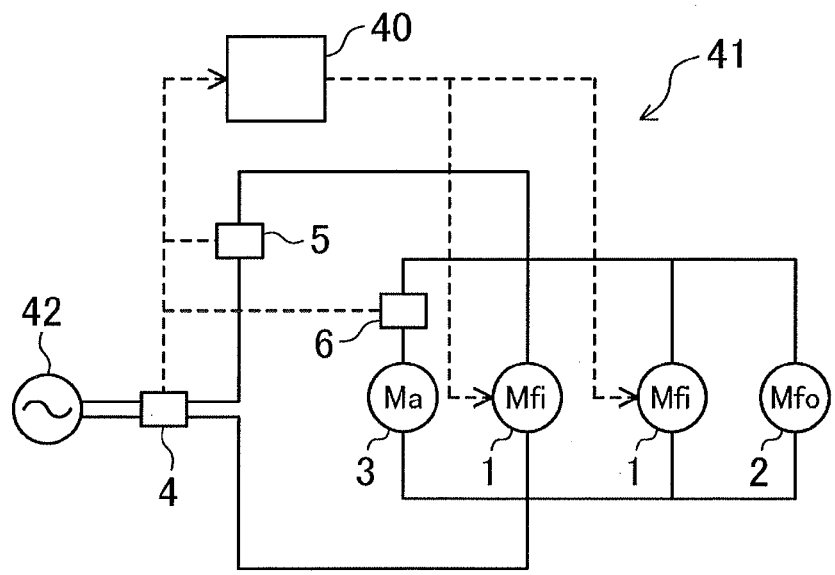
FIG. 5 is an electric circuit diagram of the container refrigeration apparatus.
Figure 6:
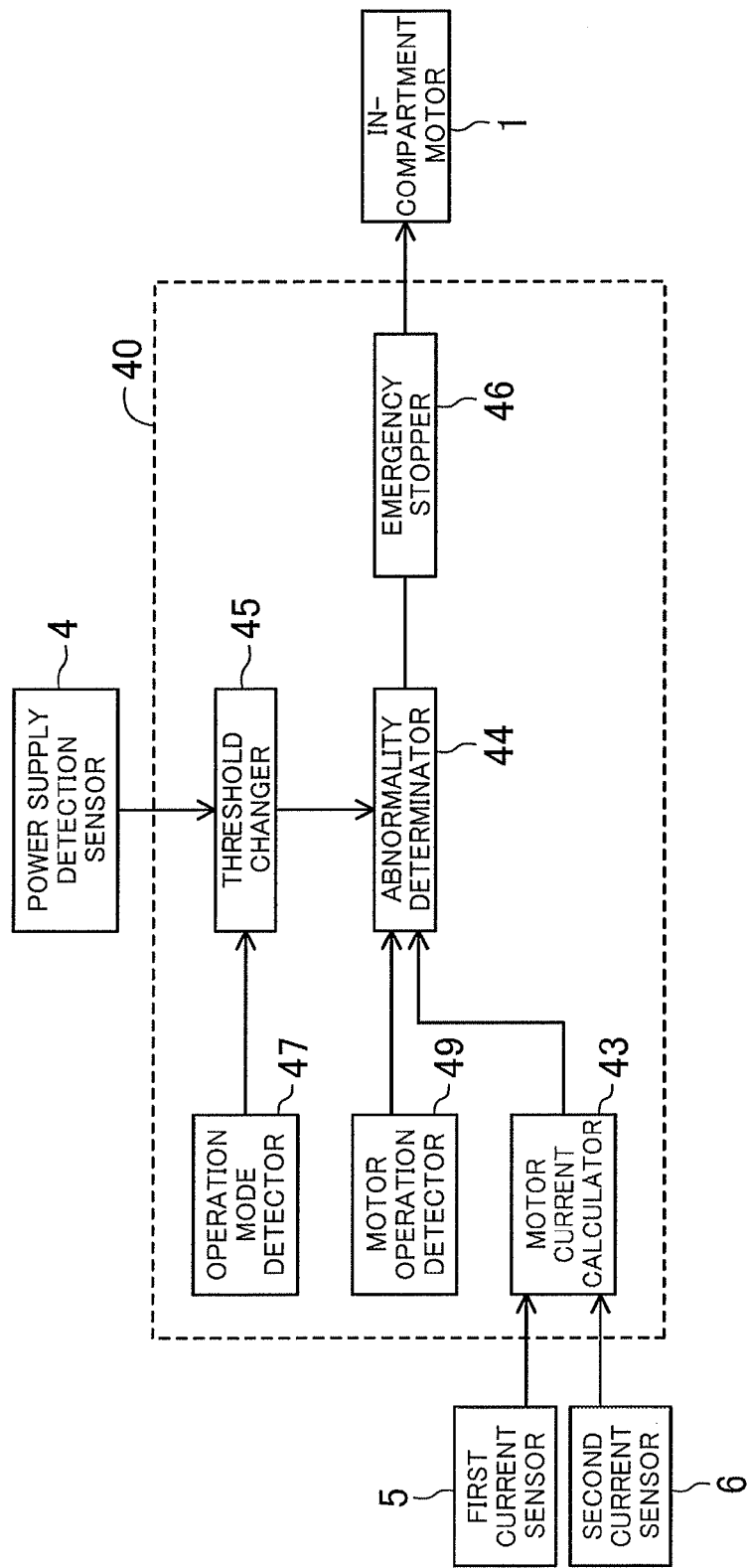
FIG. 6 is a block diagram illustrating a configuration of a controller.

Referring to FIG. 5, the compressor motor (3), the outside-compartment motor (2), and the in-compartment motors (1) are connected to an electric circuit (41). The electric circuit (41) is further connected to a power supply (42). Moreover, a power supply detection sensor (4), a first current sensor (5), and a second current sensor (6) are connected to the electric circuit (41).

The power supply detection sensor (4) is configured to detect the supply voltage and the supply frequency of the power supply (42). The first current sensor (5) is configured to detect a value (i.e., a total current value) for current flowing from the power supply (42) to the electric circuit (41). The second current sensor (6) is configured to detect current flowing through the compressor motor (3).

<Controller>

The controller (40) is configured to control operation of the container refrigeration apparatus (10). The controller (40) includes an operation mode detector (47), a motor operation detector (49), a motor current calculator (43), an abnormality determinator (44), a threshold changer (45), and an emergency stopper (46). The power supply detection sensor (4), the first current sensor (5), and the second current sensor (6) are electrically connected to the controller (40).

Operation Mode Detector

Operation of the container refrigeration apparatus (10) is switchable between a test operation mode and a normal operation mode. The test operation mode is an operation mode performed before luggage is loaded into the container. Operation of the container refrigeration apparatus (10) is checked in the test operation mode. The normal operation mode is an operation mode performed after the luggage is loaded into the container. The container in the normal operation mode is loaded into a ship.

The operation mode detector (47) is configured to detect whether the container refrigeration apparatus (10) is operated in the test operation mode or the normal operation mode. A signal indicating the operation mode of the container refrigeration apparatus (10) is output from the operation mode detector (47) to the threshold changer (45).

Motor Operation Detector

The motor operation detector (49) is configured to detect start/stop of the compressor motor (3), the outside-compartment motor (2), and the two in-compartment motors (1). A signal indicating the start/stop of each motor (1, 2, 3) is output from the motor operation detector (49) to the abnormality determinator (44).

Motor Current Calculator

The motor current calculator (43) is configured to calculate a current value in operation of the in-compartment motor(s) (1). In the present embodiment, a value for current flowing through each in-compartment motor (1) is not directly detected by a sensor. The motor current calculator (43) obtains the current value in such a manner that a current value (i.e., a current value of the compressor motor (3)) of the second current sensor (6) and a rated current value of the outside-compartment motor (2) are subtracted from a current value (i.e., a total current value of the electric circuit (41)) of the first current sensor (5). The outside-compartment motor (2) is a constant-speed motor, and does not stop during operation of the container refrigeration apparatus (10). Thus, the current of the outside-compartment motor (2) is not measured, and a rated current value (i.e., a fixed value) determined depending on specifications of the outside-compartment motor (2) is used. A signal indicating the current value of the in-compartment motor(s) (1) calculated by the motor current calculator (43) is output to the abnormality determinator (44).

Abnormality Determinator

The abnormality determinator (44) is configured to compare the value for current flowing through each in-compartment motor (1) with a preset current threshold to determine occurrence of abnormalities of each in-compartment motor (1). In the present embodiment, the motor abnormalities include a lock abnormality and a connection abnormality. Specifically, the abnormality determinator (44) determines occurrence of the lock abnormality and the connection abnormality of each in-compartment motor (1). The lock abnormality is the state in which a stator of the in-compartment motor (1) is immobile, and the connection abnormality is the state in which a coil of the in-compartment motor (1) is disconnected.

The abnormality determinator (44) is configured to compare the magnitude of each of a current threshold for lock abnormality and a current threshold for connection abnormality with the magnitude of a value (i.e., the current value of each in-compartment motor (1)) calculated by the motor current calculator (43) to detect the abnormalities.

If the current value of the in-compartment motor (1) is greater than the current threshold for lock abnormality, the abnormality determinator (44) determines that the lock abnormality occurs in the in-compartment motor (1). If the current value of the in-compartment motor (1) is less than the current threshold for connection abnormality, the abnormality determinator (44) determines that the connection abnormality occurs in the in-compartment motor (1).

A first threshold and a second threshold are set for the current threshold for lock abnormality. The first threshold is a value when one of the in-compartment motors (1) is operated, and the second threshold is a value when both in-compartment motors (1) are operated. The abnormality determinator (44) determines, depending on an input value (i.e., the operation state of each motor) from the motor operation detector (49), occurrence of the lock abnormality based on the first threshold when one of the in-compartment motors (1) is operated, and determines occurrence of the lock abnormality based on the second threshold when both in-compartment motors (1) are operated. Note that the foregoing current thresholds are determined based on the value for current flowing into the in-compartment motor (1) upon rated operation of the container refrigeration apparatus (10), i.e., determined based on the rated current value.

As in the case of the lock abnormality, a first threshold and a second threshold are also set for the current threshold for connection abnormality. The abnormality determinator (44) determines occurrence of the connection abnormality based on the first threshold when one of the in-compartment motors (1) is operated, and determines occurrence of the connection abnormality based on the second threshold when both in-compartment motors (1) are operated.

A signal indicating determination of the abnormality determinator (44) on occurrence of the abnormalities of each in-compartment motor (1) is transmitted to the emergency stopper (46).

Threshold Changer

The threshold changer (45) is configured to change the current thresholds of the abnormality determinator (44) in accordance with a detection value (i.e., the supply voltage and the supply frequency of the power supply (42)) of the power supply detection sensor (4). The threshold changer (45) stores, for each supply frequency, correlation data indicating a relationship between the supply voltage and each of the first and second thresholds.

The threshold changer (45) calculates, based on the correlation data, the first and second thresholds for lock abnormality and the first and second thresholds for connection abnormality from the detection value (i.e., the supply voltage and the supply frequency of the power supply (42)) of the power supply detection sensor (4). The threshold changer (45) outputs a signal indicating the calculated thresholds to the abnormality determinator (44). As a result, the thresholds of the abnormality determinator (44) are changed.

Figure 7:
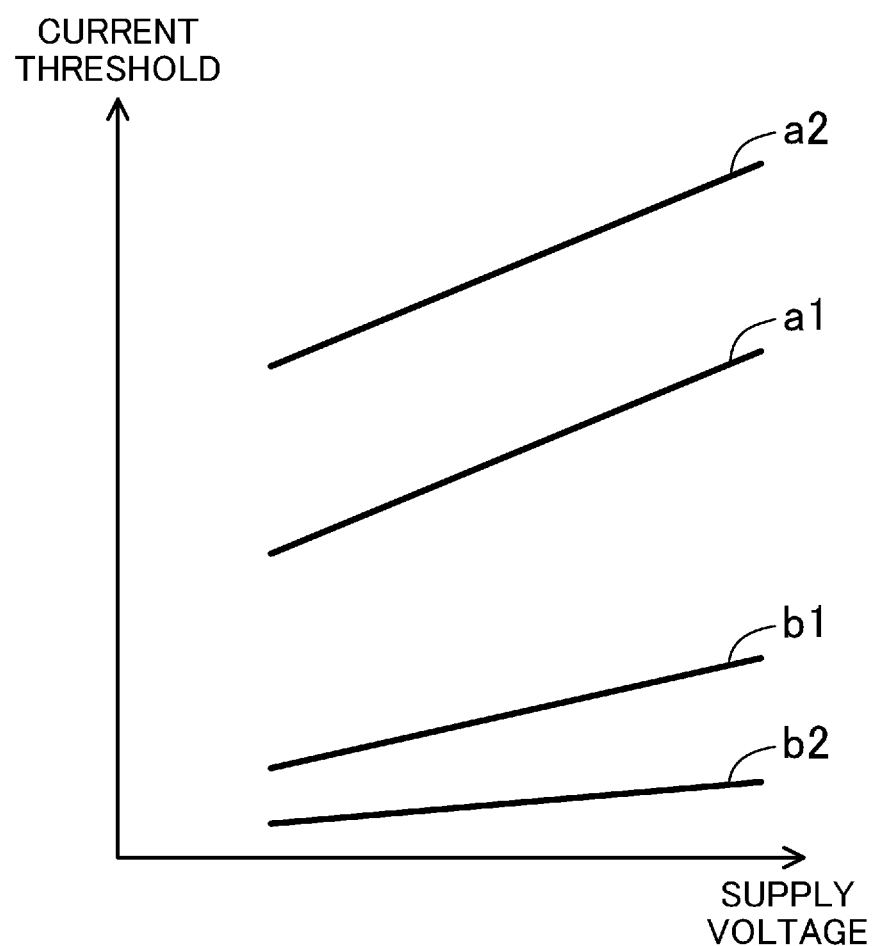
FIG. 7 is a graph illustrating a relationship between a current threshold and a supply voltage.

FIG. 7 is a graph illustrating, for a certain supply frequency, a relationship between each of the current thresholds for lock abnormality and the current thresholds for connection abnormality and a supply voltage value. The threshold changer (45) increases/decreases each current threshold based on the operation mode of the container refrigeration apparatus (10). Specifically, the threshold changer (45) sets, in the case of the lock abnormality, such that the threshold (see "a1" in FIG. 7) for test operation mode is lower than the threshold (see "a2" in FIG. 7) for normal operation mode. On the other hand, the threshold changer (45) sets, in the case of the connection abnormality, such that the threshold (see "b1" in FIG. 7) for test operation mode is higher than the threshold (see "b2" in FIG. 7) for normal operation mode.

That is, determination conditions for occurrence of the abnormalities in the test operation mode are stricter than those for occurrence of the abnormalities in the normal operation mode. Thus, the abnormalities of each in-compartment fan (26) are easily detected before the container (C) is loaded into the ship.

Emergency Stopper

The emergency stopper (46) is configured to urgently stop the in-compartment motor(s) (1) based on determination of the abnormality determinator (44). Operation of the emergency stopper (46) is different between the test operation mode and the normal operation mode. In the test operation mode, if the abnormality occurs in one of the two in-compartment motors (1), the two in-compartment motors (1) are urgently stopped. However, in the normal operation mode, only the in-compartment motor (1) in which the abnormality occurs is stopped. Thus, the cooling capacity of the container refrigeration apparatus is decreased, but a cooling operation continues. This prevents the temperature of the luggage in the container from reaching a normal temperature.

Operation

Next, operation of the container refrigeration apparatus (10) of the present embodiment will be described.

When a user turns on an operation switch, power is, by an operation command of the controller (40), supplied from the power supply (42) to the compressor motor (3), the outside-compartment motor (2), and the in-compartment motors (1) to drive the compressor (21), the outside-compartment fan (24), and the in-compartment fans (26).

When the compressor (21) is driven, refrigerant starts circulating through the refrigerant circuit (20). When the outside-compartment fan (24) and the in-compartment fans (26) are driven, air inside the container (C) starts flowing toward the evaporator (25) of the refrigerant circuit (20), and air outside the container (C) starts flowing toward the condenser (23) of the refrigerant circuit (20). Then, heat is exchanged between the in-compartment air and the refrigerant in the evaporator (25). The low-pressure refrigerant in the evaporator (25) is evaporated by absorbing the heat from the in-compartment air, and the in-compartment air is cooled due to removal of the heat by the low-pressure refrigerant. The inside of the container (C) is cooled in such a manner that the in-compartment air is cooled as described above.

Next, operation of the controller (40) for determining occurrence of the lock abnormality and the connection abnormality of the in-compartment motors (1) will be described.

The controller (40) monitors the current value of the in-compartment motor (1). When such a current value reaches greater than the current threshold for lock abnormality, the controller (40) determines that the lock abnormality occurs in the in-compartment motor (1). When it is determined that the lock abnormality occurs in the in-compartment motor (1), the controller (40) urgently stops operation of both in-compartment fans (26), except for the case of the normal operation mode. In the normal operation mode, if the lock abnormality occurs only in one of the in-compartment motors (1), the controller (40) continues operation of the other in-compartment motor (1).

If the current value of the in-compartment motor (1) reaches less than the current threshold for connection abnormality, the controller (40) determines that the connection abnormality occurs in the in-compartment motor (1). When it is determined that the connection abnormality occurs in the in-compartment motor (1), the controller (40) urgently stops operation of both in-compartment fans (26), except for the case of the normal operation mode. In the normal operation mode, if the connection abnormality occurs only in one of the in-compartment motors (1), the controller (40) continues operation of the other in-compartment motor (1).

Detection timing in determination of occurrence of the motor abnormalities is different between the test operation mode and the normal operation mode. As described above, since the test operation mode is performed before the container (C) is loaded into the ship, it should be ensured that the motor abnormalities are detected, and it is necessary to set the strict determination conditions for motor abnormalities. Thus, detection of the motor abnormalities is continuously performed in the refrigeration operation or the freezing operation of the test operation mode.

On the other hand, in the freezing operation of the normal operation mode, the detection timing is set at the time of first thermo-off or at the time of thermo-off after the lapse of a predetermined time from the first thermo-off in order to prevent the in-compartment fan(s) (26) from being urgently stopped due to erroneous detection.

As described above, the controller (40) determines occurrence of the abnormalities of the in-compartment motors (1).

Advantages of the Embodiment

According to the present embodiment, since the current thresholds of the abnormality determinator (44) are changed based on the supply voltage for each supply frequency of the power supply (42), the accuracy of determination of occurrence of the lock abnormality of the in-compartment motors (1) can be increased. This reduces or prevents erroneous detection of the motor abnormalities.

According to the present embodiment, a higher current threshold is set when the supply voltage increases, and a lower current threshold is set when the supply voltage decreases. Thus, the accuracy of determination of occurrence of the lock abnormality of the in-compartment motors (1) can be increased.

According to the present embodiment, since the current thresholds of the abnormality determinator (44) are changed based on the supply frequency of the power supply (42), the accuracy of determination of occurrence of the lock abnormality of the in-compartment motors (1) can be increased. This reduces or prevents erroneous detection of the motor abnormalities.

According to the present embodiment, a higher current threshold is set when the supply frequency increases, and a lower current threshold is set when the supply frequency decreases. Thus, the accuracy of determination of occurrence of the connection abnormality of the in-compartment motors (1) can be increased.

According to the present embodiment, since the current value of the in-compartment motor (1) is extremely smaller than the current value of the compressor motor (3), a high accuracy detector is required to directly detect the current value of the in-compartment motor (1). However, since the detector is provided in the compressor motor (3), the current value can be detected by the typical detector. Moreover, since the current value of the in-compartment motor (1) is estimated from the current value of the compressor motor (3), a cost for detection of the current value of the in-compartment motor (1) can be reduced.

Second Embodiment

Figure 8:
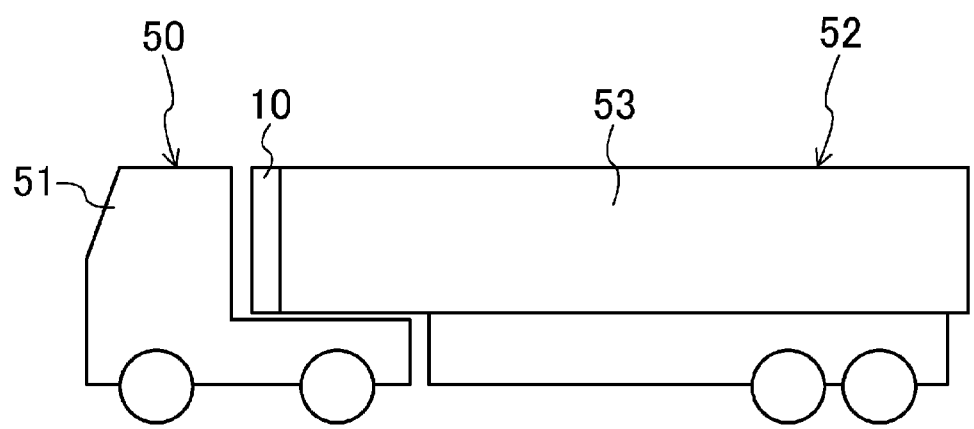
FIG. 8 is a schematic side view of a refrigerator vehicle including a trailer refrigeration apparatus of a second embodiment of the present disclosure.

In a second embodiment, a transport refrigeration apparatus is employed as a trailer refrigeration apparatus (10) as illustrated in FIG. 8. The trailer refrigeration apparatus (10) is mounted in a large-sized refrigerator vehicle (50) for, e.g., ground transportation of fresh food or frozen food.

In the refrigerator vehicle (50), a trailer head (51) which is a powered vehicle provided with an engine (not shown in the figure) and a trailer (52) is detachably connected together. The trailer refrigeration apparatus (10) is provided in the trailer (52) to cool the inside of a trailer body (53).

The trailer refrigeration apparatus (10) is configured as in the container refrigeration apparatus (10) of the first embodiment. In particular, the trailer refrigeration apparatus (10) includes an abnormality determinator (44), a threshold changer (45), etc., and changes current thresholds of the abnormality determinator (44) in accordance with a supply frequency and a supply voltage. Other configurations, operation, and advantages of the trailer refrigeration apparatus (10) are similar to those of the container refrigeration apparatus (10) of the first embodiment.

Other Embodiments

Each of the foregoing embodiments of the present disclosure may have the following configurations.

In each of the foregoing embodiments, abnormality detection is performed for the in-compartment motors (1) of the in-compartment fans (26). The lock abnormality and the connection abnormality may be detected in fans and fan motors including the outside-compartment fan (24) and the outside-compartment motor (2) in the present disclosure.

The motor abnormalities of the present disclosure may include abnormalities other than the lock abnormality and the connection abnormality.

The transport refrigeration apparatus of the present disclosure may be refrigeration apparatuses other than the container refrigeration apparatus (10) and the trailer refrigeration apparatus (10). That is, the transport refrigeration apparatus of the present disclosure may be any refrigeration apparatuses for transporting goods.

INDUSTRIAL APPLICABILITY

As described above, the present disclosure relates to a transport refrigeration apparatus. In particular, the present disclosure is useful for abnormality detection of a motor used for a transport refrigeration apparatus.

DESCRIPTION OF REFERENCE CHARACTERS

1 In-Compartment Motor (Fan Motor)
2 Outside-Compartment Motor
3 Compressor Motor
4 Power Supply Detection Sensor
5 First Current Sensor (First Detector)
6 Second Current Sensor (Second Detector)
10 Container Refrigeration Apparatus
20 Refrigerant Circuit
40 Controller
41 Operation Mode Detector
42 Motor Operation Detector
43 Motor Current Calculator
44 Abnormality Determinator
45 Threshold Changer
46 Emergency Stopper

The invention claimed is:

1. A transport refrigeration apparatus including a refrigerant circuit in which a refrigeration cycle is performed, comprising:
a fan configured to supply air to an air heat exchanger connected to the refrigerant circuit;
a fan motor configured to drive the fan;
a power supply sensor that detects a supply frequency and a supply voltage of a power supply configured to supply power to the fan motor;
an abnormality determiner configured to compare a current value for current flowing through the fan motor with a preset current threshold to determine occurrence of a motor abnormality of the fan motor; and
a threshold changer configured to change the current threshold of the abnormality determiner in accordance with the detected supply frequency and the detected supply voltage of the power supply configured to supply power to the fan motor,
wherein the threshold changer stores a plurality of predetermined correlations between the detected supply voltage and the current threshold for respective supply frequencies, each of the plurality of correlations defining a different relationship between the current threshold and the supply voltage, and
when the power supply sensor detects a new supply frequency, the threshold changer calculates based on one of the plurality of correlations corresponding to the new supply frequency, to determine the current threshold to coincide with the detected supply voltage.

2. The transport refrigeration apparatus of claim 1, wherein
if the current value of the fan motor is greater than a preset current threshold for lock abnormality, the abnormality determiner determines that the motor abnormality is a lock abnormality.

3. The transport refrigeration apparatus of claim 2, wherein
for each value for frequency of the power supply, the threshold changer increases the current threshold for lock abnormality when the supply voltage of the power supply increases, and
decreases the current threshold for lock abnormality when the supply voltage of the power supply decreases.

4. The transport refrigeration apparatus of claim 1, wherein
if the current value of the fan motor is less than a preset current threshold for connection abnormality, the abnormality determiner determines that the motor abnormality is a connection abnormality.

5. The transport refrigeration apparatus of claim 4, wherein
for each value for frequency of the power supply, the threshold changer
increases the current threshold for connection abnormality when the supply voltage of the power supply increases, and
decreases the current threshold for connection abnormality when the supply voltage of the power supply decreases.

6. The transport refrigeration apparatus of claim 1, further comprising:
a compressor motor configured to drive a compressor connected to the refrigerant circuit;
an electric circuit connected to the fan motor and the compressor motor;
a first detector configured to detect a current value for current flowing from the power supply to the electric circuit; and
a second detector configured to detect a current value for current flowing through the compressor motor,
wherein the current value for current flowing through the fan motor is determined based on a value obtained by subtracting the current value of the second detector from the current value of the first detector.

7. The transport refrigeration apparatus of claim 2, further comprising:
a compressor motor configured to drive a compressor connected to the refrigerant circuit;
an electric circuit connected to the fan motor and the compressor motor;

a first detector configured to detect a current value for current flowing from the power supply to the electric circuit; and a second detector configured to detect a current value for current flowing through the compressor motor, wherein the current value for current flowing through the fan motor is determined based on a value obtained by subtracting the current value of the second detector from the current value of the first detector.

8. The transport refrigeration apparatus of claim 3, further comprising:

a compressor motor configured to drive a compressor connected to the refrigerant circuit;

an electric circuit connected to the fan motor and the compressor motor;

a first detector configured to detect a current value for current flowing from the power supply to the electric circuit; and a second detector configured to detect a current value for current flowing through the compressor motor, wherein the current value for current flowing through the fan motor is determined based on a value obtained by subtracting the current value of the second detector from the current value of the first detector.

9. The transport refrigeration apparatus of claim 4, further comprising:

a compressor motor configured to drive a compressor connected to the refrigerant circuit;

an electric circuit connected to the fan motor and the compressor motor;

a first detector configured to detect a current value for current flowing from the power supply to the electric circuit; and a second detector configured to detect a current value for current flowing through the compressor motor, wherein the current value for current flowing through the fan motor is determined based on a value obtained by subtracting the current value of the second detector from the current value of the first detector.

10. The transport refrigeration apparatus of claim 5, further comprising:

a compressor motor configured to drive a compressor connected to the refrigerant circuit;

an electric circuit connected to the fan motor and the compressor motor;

a first detector configured to detect a current value for current flowing from the power supply to the electric circuit; and a second detector configured to detect a current value for current flowing through the compressor motor, wherein the current value for current flowing through the fan motor is determined based on a value obtained by subtracting the current value of the second detector from the current value of the first detector.

* * * * *